(12) United States Patent
Kim et al.

(10) Patent No.: US 10,807,488 B2
(45) Date of Patent: Oct. 20, 2020

(54) CHARGING APPARATUS FOR ELECTRIC VEHICLE

(71) Applicants: HYUNDAI MOTOR COMPANY, Seoul (KR); KIA MOTORS CORPORATION, Seoul (KR)

(72) Inventors: JongPil Kim, Yongin-si (KR); Sihun Yang, Hwaseong-si (KR); Woo Young Lee, Yongin-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 119 days.

(21) Appl. No.: 16/171,002

(22) Filed: Oct. 25, 2018

(65) Prior Publication Data

US 2020/0009966 A1    Jan. 9, 2020

(30) Foreign Application Priority Data

Jul. 5, 2018 (KR) .......................... 10-2018-0078018

(51) Int. Cl.
*H02J 7/02* (2016.01)
*B60L 53/30* (2019.01)
(Continued)

(52) U.S. Cl.
CPC ............... *B60L 53/30* (2019.02); *B60L 53/14* (2019.02); *H02J 7/022* (2013.01);
(Continued)

(58) Field of Classification Search
USPC ....................................................... 320/109
See application file for complete search history.

(56) References Cited

U.S. PATENT DOCUMENTS 9,493,080 B2   11/2016   Kvieska et al.
2010/0080022 A1   4/2010   Schmidt
(Continued)

FOREIGN PATENT DOCUMENTS

DE   10-2011-007-839 A1   10/2012
EP   2869445 A1   5/2015
EP   3057197 A1   8/2016

OTHER PUBLICATIONS

European Search Report dated Apr. 30, 2019 from the corresponding Korean Application No. 18203413.2, 8 pp.

*Primary Examiner* — Eric D Lee
(74) *Attorney, Agent, or Firm* — Brinks Gilson & Lione

(57) ABSTRACT

A charging apparatus for an electric vehicle is disclosed. The charging apparatus includes an AC power input stage receiving at least one AC input power from among single-phase AC power and multi-phase AC power, a power factor corrector having full bridge circuits receiving AC input power, a link capacitor charged through the power factor corrector, a switch network having a first switch connecting any one of an AC power input line and a neutral line of the AC power input stage to the power factor corrector and at least one second switch connecting the AC power input stage to the power factor corrector or the link capacitor, and a controller controlling the power factor corrector and the switch network according to AC input power condition. The second switch includes switches selectively connecting at least one full bridge circuit to a positive(+) electrode of a battery.

24 Claims, 13 Drawing Sheets

(51) Int. Cl.
*B60L 53/14* (2019.01)
*H02M 1/42* (2007.01)
*H02M 1/44* (2007.01)

(52) U.S. Cl.
CPC ....... *H02M 1/4225* (2013.01); *H02M 1/4233* (2013.01); *B60L 2210/22* (2013.01); *H02M 1/44* (2013.01)

(56) References Cited

U.S. PATENT DOCUMENTS

| | | | |
|---|---|---|---|
| 2013/0106195 A1 | 5/2013 | Kusch et al. | |
| 2015/0311782 A1* | 10/2015 | Chien | H02M 1/4216 363/126 |
| 2019/0202300 A1* | 7/2019 | Pastor | H02J 7/04 |

* cited by examiner

CHARGING APPARATUS FOR ELECTRIC VEHICLE

CROSS-REFERENCE TO RELATED APPLICATION

The present application claims priority to and the benefit of Korean Patent Application No. 10-2018-0078018, filed on Jul. 5, 2018, which is incorporated herein by reference in its entirety.

FIELD

The present disclosure relate to a vehicle, and more particularly to a charging apparatus for an electric vehicle configured to travel only using power of a motor.

BACKGROUND

The statements in this section merely provide background information related to the present disclosure and may not constitute prior art.

Differently from an internal combustion vehicle designed to obtain main energy by burning fossil fuels, an electric vehicle is designed to use electricity as a main energy source. Therefore, it is necessary for the electric vehicle to include a high-voltage battery to store electric energy therein, a motor used as a power source, and an inverter to drive the motor.

A charger for charging a battery of the electric vehicle may be classified into a slow-speed charger and a high-speed charger. The slow-speed charger may transmit commercial AC power to a vehicle without change. The high-speed charger may convert commercial AC power into DC power, and may transmit the DC power to the vehicle. The slow-speed charger has a simplified structure and is inexpensive, such that the slow-speed charger can be easily developed and rapidly come into widespread use. However, in order to use the slow-speed charger, an On Board Charger (OBC) needs to be mounted to the electric vehicle.

There are various kinds of AC powers provided through the slow-speed charger according to individual countries in which slow-speed chargers are installed. In order to charge a battery of the electric vehicle using various kinds of AC powers, it is necessary for On Board Chargers (OBCs) to cope with various kinds of AC power.

As a battery of the electric vehicle has higher capacity, a range of the electric vehicle provided with the battery charged once is also increasing. Therefore, many developers and vehicle companies are conducting intensive research into technology for increasing battery capacity of electric vehicles. A large-capacity battery embedded in the electric vehicle unavoidably incurs increase in charging time of the electric vehicle. In order to reduce the charging time of the large-capacity battery, there is a need to increase the OBC capacity. Increasing OBC capacity may unavoidably increase the size of constituent elements of the electric vehicle and production costs of the electric vehicle.

SUMMARY

Therefore, it is an aspect of the present disclosure to provide a charging apparatus for an electric vehicle, which has a small and simple structure, and charges a battery of an electric vehicle upon receiving electricity from various kinds of power sources.

Additional aspects of the disclosure will be set forth in part in the description which follows and, in part, will be obvious from the description, or may be learned by practice of the disclosure.

In accordance with an aspect of the present disclosure, a charging apparatus for an electric vehicle includes an alternating current (AC) power input stage configured to receive at least one AC input power from among single-phase AC power and multi-phase AC power, a power factor corrector having a plurality of full bridge circuits configured to receive the AC input power through the AC power input stage, a link capacitor configured to be charged through the power factor corrector, a switch network having not only a first switch S1 for connecting any one of an AC power input line and a neutral line of the AC power input stage to the power factor corrector, but also at least one second switch for selectively connecting the AC power input stage to the power factor corrector or the link capacitor, and a controller configured to control the power factor corrector and the switch network according to a condition of AC input power received through the AC power input stage. The at least one second switch includes a plurality of switches S3, S4, S5, S6 and S7 configured to selectively connect at least one full bridge circuit from among the plurality of full bridge circuits to a positive(+) electrode of a battery.

The plurality of full bridge circuits may include a first full bridge circuit and a second full bridge circuit.

A first leg of the first full bridge circuit may be connected to a first AC power input line of the AC power input stage, and a second leg of the first full bridge circuit may be selectively connected to any one of a second AC power input line of the AC power input stage and the neutral line through the first switch S1.

A first leg of the second full bridge circuit may be connected to a third AC power input line of the AC power input stage through a combination of a third switch S2 and a fourth switch S5, and a second leg of the second full bridge circuit may be connected to the third AC power input line of the AC power input stage through the third switch S2.

The switch network may further include a fifth switch S3, one end of which is connected to the first leg of the first full bridge circuit, and a sixth switch S4, one end of which is connected to the second leg of the first full bridge circuit.

The switch network may further include a seventh switch S6 disposed between the other end of the fifth switch S3 and the positive(+) electrode of the battery.

The fourth switch S5 may be switched between the other end of the fifth switch S3 and the first and second legs of the second full bridge circuit.

The switch network may further include an eighth switch S7 configured to be switched among an upper end of the second full bridge circuit, the other end of the fifth switch, and an upper end of the first full bridge circuit.

The switch network may further include a ninth switch S8 and a tenth switch S9 through which both ends of the link capacitor are connected to a positive(+) electrode and a negative(−) electrode of the battery.

The switch network may further include an eleventh switch S10 configured to connect the upper end of the first full bridge circuit to one end of the link capacitor.

The condition of the AC input power may include a multi-phase condition and a single-phase condition of the AC input power.

The condition of the AC input power may include a symmetric power condition and an asymmetric power condition of the AC input power.

In accordance with another aspect of the present disclosure, a charging apparatus for an electric vehicle includes an alternating current (AC) power input stage configured to receive at least one AC input power from among single-phase AC power and multi-phase AC power, a power factor corrector having a first full bridge circuit and a second full bridge circuit, each of which is configured to receive the AC input power through the AC power input stage, a link capacitor configured to be charged through the power factor corrector, a switch network having not only a first switch S1 for connecting any one of an AC power input line and a neutral line of the AC power input stage to the power factor corrector, but also at least one second switch for selectively connecting the AC power input stage to the power factor corrector or the link capacitor, and a controller configured to control the power factor corrector and the switch network according to a condition of AC input power received through the AC power input stage. The at least one second switch may include a plurality of switches S3, S4, S5, S6 and S7 configured to selectively connect at least one full bridge circuit from among the plurality of full bridge circuits to a positive(+) electrode of a battery. A first leg of the first full bridge circuit may be connected to a first AC power input line of the AC power input stage. A second leg of the first full bridge circuit may be selectively connected to any one of a second AC power input line of the AC power input stage and the neutral line through the first switch S1. A first leg of the second full bridge circuit may be connected to a third AC power input line of the AC power input stage through a combination of a third switch S2 and a fourth switch S5. A second leg of the second full bridge circuit may be connected to the third AC power input line of the AC power input stage through the third switch S2.

The switch network may further include a fifth switch S3, one end of which is connected to the first leg of the first full bridge circuit, and a sixth switch S4, one end of which is connected to the second leg of the first full bridge circuit.

The switch network may further include a seventh switch S6 disposed between the other end of the fifth switch S3 and the positive(+) electrode of the battery.

The fourth switch S5 may be switched between the other end of the fifth switch S3 and the first and second legs of the second full bridge circuit.

The switch network may further include an eighth switch S7 configured to be switched among an upper end of the second full bridge circuit, the other end of the fifth switch, and an upper end of the first full bridge circuit.

The switch network may further include a ninth switch S8 and a tenth switch S9 through which both ends of the link capacitor are connected to a positive(+) electrode and a negative(−) electrode of the battery.

The switch network may further include an eleventh switch S10 configured to connect the upper end of the first full bridge circuit to one end of the link capacitor.

The condition of the AC input power may include a multi-phase condition and a single-phase condition of the AC input power.

The condition of the AC input power may include a symmetric power condition and an asymmetric power condition of the AC input power.

In accordance with another aspect of the present disclosure, a charging apparatus for an electric vehicle includes an alternating current (AC) power input stage configured to receive at least one AC input power from among single-phase AC power and multi-phase AC power, a power factor corrector having a first full bridge circuit and a second full bridge circuit, each of which is configured to receive the AC input power through the AC power input stage, a link capacitor configured to be charged through the power factor corrector, a switch network having not only a first switch S1 for connecting any one of an AC power input line and a neutral line of the AC power input stage to the power factor corrector, but also at least one second switch for selectively connecting the AC power input stage to the power factor corrector or the link capacitor, and a controller configured to control the power factor corrector and the switch network according to a condition of AC input power received through the AC power input stage. The at least one second switch may include a plurality of switches S3, S4, S5, S6 and S7 configured to selectively connect at least one full bridge circuit from among the plurality of full bridge circuits to a positive(+) electrode of a battery. A first leg of the first full bridge circuit may be connected to a first AC power input line of the AC power input stage. A second leg of the first full bridge circuit may be selectively connected to any one of a second AC power input line of the AC power input stage and the neutral line through the first switch S1. A first leg of the second full bridge circuit may be connected to a third AC power input line of the AC power input stage through a combination of a third switch S2 and a fourth switch S5. A second leg of the second full bridge circuit may be connected to the third AC power input line of the AC power input stage through the third switch S2. The switch network may further include a fifth switch S3, one end of which is connected to the first leg of the first full bridge circuit, a sixth switch S4, one end of which is connected to the second leg of the first full bridge circuit, a seventh switch S6 disposed between the other end of the fifth switch S3 and the positive(+) electrode of the battery, an eighth switch S7 configured to be switched among an upper end of the second full bridge circuit, the other end of the fifth switch, and an upper end of the first full bridge circuit, a ninth switch S8 and a tenth switch S9 through which both ends of the link capacitor are connected to a positive(+) electrode and a negative(−) electrode of the battery, and an eleventh switch S10 configured to connect the upper end of the first full bridge circuit to one end of the link capacitor, wherein the fourth switch S5 is switched between the other end of the fifth switch S3 and the first and second legs of the second full bridge circuit.

The condition of the AC input power may include a multi-phase condition and a single-phase condition of the AC input power.

The condition of the AC input power may include a symmetric power condition and an asymmetric power condition of the AC input power.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
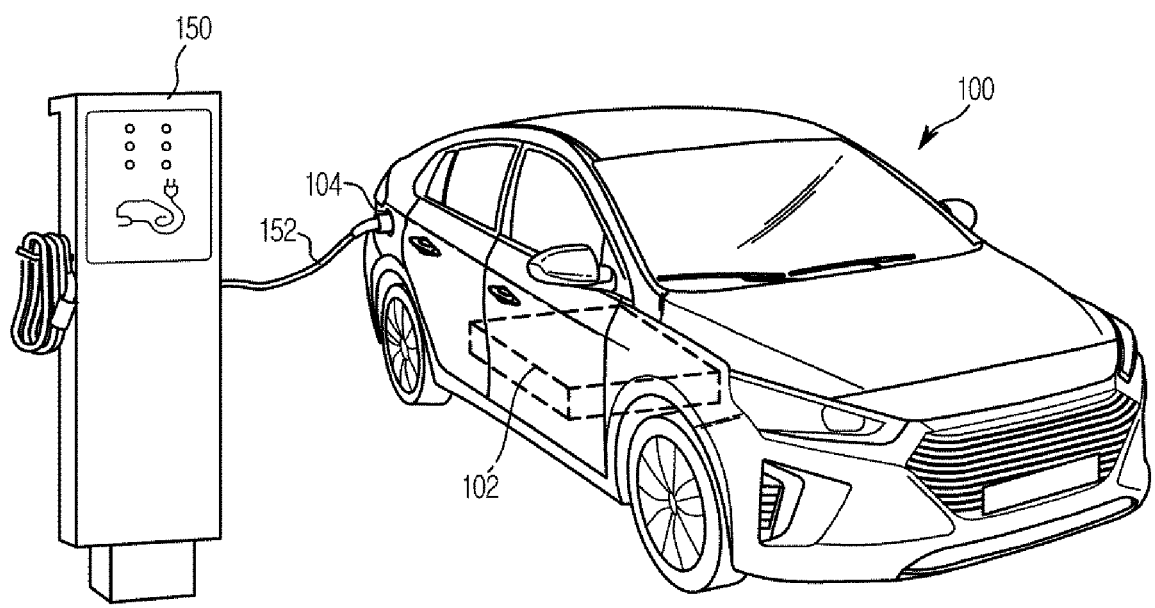
FIG. 1 is a view illustrating an electric vehicle in one form of the present disclosure.

The description of the disclosure is merely exemplary in nature and, thus, variations that do not depart form the substance of the disclosure are intended to be within the scope of the disclosure. Such variations are not to be regarded as a departure from the spirit and scope of the disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view illustrating the appearance of an electric vehicle 100 in some forms of the present disclosure.

Figure 2:
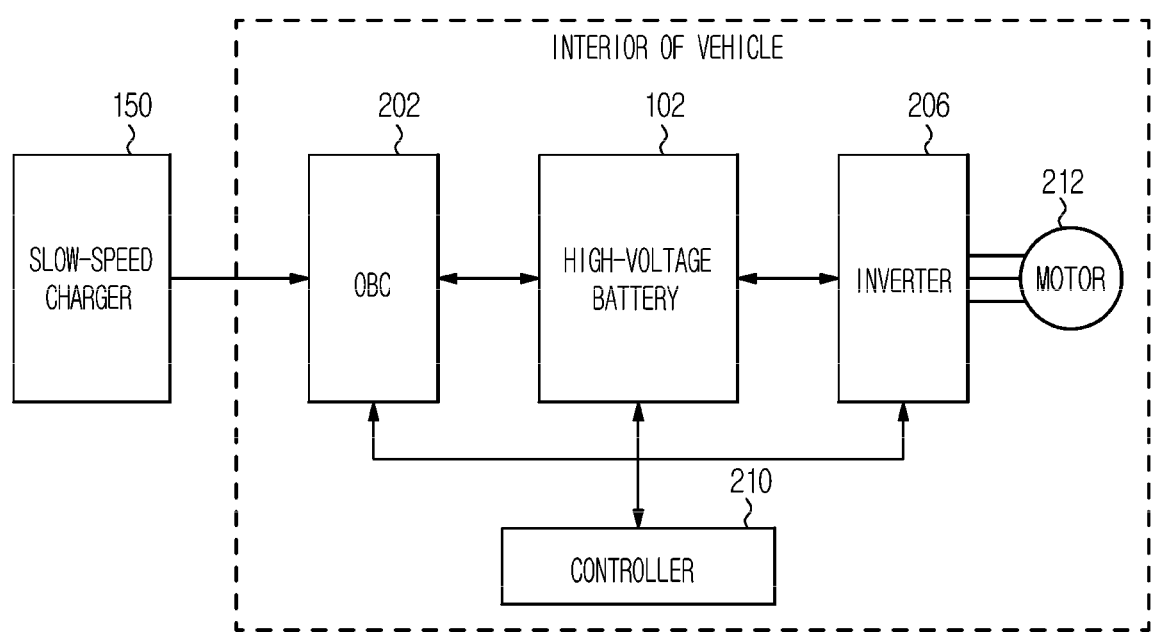
FIG. 2 is a block diagram illustrating a charging apparatus for an electric vehicle in one form of the present disclosure.

Referring to FIG. 1, the electric vehicle 100 may include a motor 212 (see FIG. 2). Therefore, the electric vehicle 100 may further include a high-voltage battery 102 configured to store power to be used for driving the motor 212. An auxiliary battery 208 (see FIG. 2) may also be provided to a general internal combustion vehicle. However, a large high-capacity high-voltage battery 212 is needed for the electric vehicle 100 whereas an auxiliary battery 208 (see FIG. 2) is provided at one side of an engine compartment of a general internal combustion vehicle. In the electric vehicle 100 in some forms of the present disclosure, a battery 102 is installed at a lower space of a rear passenger seat. Power stored in the battery 102 may be used to generate power by driving the motor 212 (see FIG. 2). The battery 102 in some forms of the present disclosure may be a lithium battery.

The electric vehicle 100 may be equipped with a charging socket 104 acting as a charging inlet. A charging connector 152 of an external slow-speed charger 150 may be connected to the charging socket 104, such that the high-voltage battery 102 can be charged with electricity or power. That is, when the charging connector 152 of the slow-speed charger 150 is connected to the charging socket 104 of the electric vehicle 100, the high-voltage battery 102 of the electric vehicle 100 can be charged with electricity or power.

FIG. 2 is a block diagram illustrating a charging apparatus for the electric vehicle in some forms of the present disclosure.

Referring to FIG. 2, a slow-speed charger 150 may be used to charge the high-voltage battery 102. The high-voltage battery 102 may have a charging voltage of 400V-800V. The slow-speed charger 150 may supply AC power to the electric vehicle 100 without change. The AC power supplied through the slow-speed charger 150 may be converted into a predetermined DC voltage by the electric vehicle 100.

An On Board Charger (OBC) 202 embedded in the electric vehicle 100 may be used to charge the high-voltage battery 102. The OBC 202 may convert AC power supplied from the slow-speed charger 150 into a DC voltage of 800V, and may charge the high-voltage battery 102 with the DC voltage of 800V. The slow-speed charger 150 may supply AC power to the electric vehicle 100 without change. The AC voltage supplied through the slow-speed charger 150 may be converted into a DC voltage by the OBC 202, and may be used to charge the high-voltage battery 102.

In FIG. 2, an inverter 206 may convert power of the high-voltage battery 102 into electrical characteristics needed for a motor 212, and may transmit the electrical characteristics to the motor 212. The motor 212 may rotate by power received through the inverter 206, thereby generating power. In the charging apparatus of FIG. 2, only the OBC 202 may be concerned with charging of the high-voltage battery 102, and the motor 212 and the inverter 206 may not be concerned with charging of the high-voltage battery 102.

Figure 3:
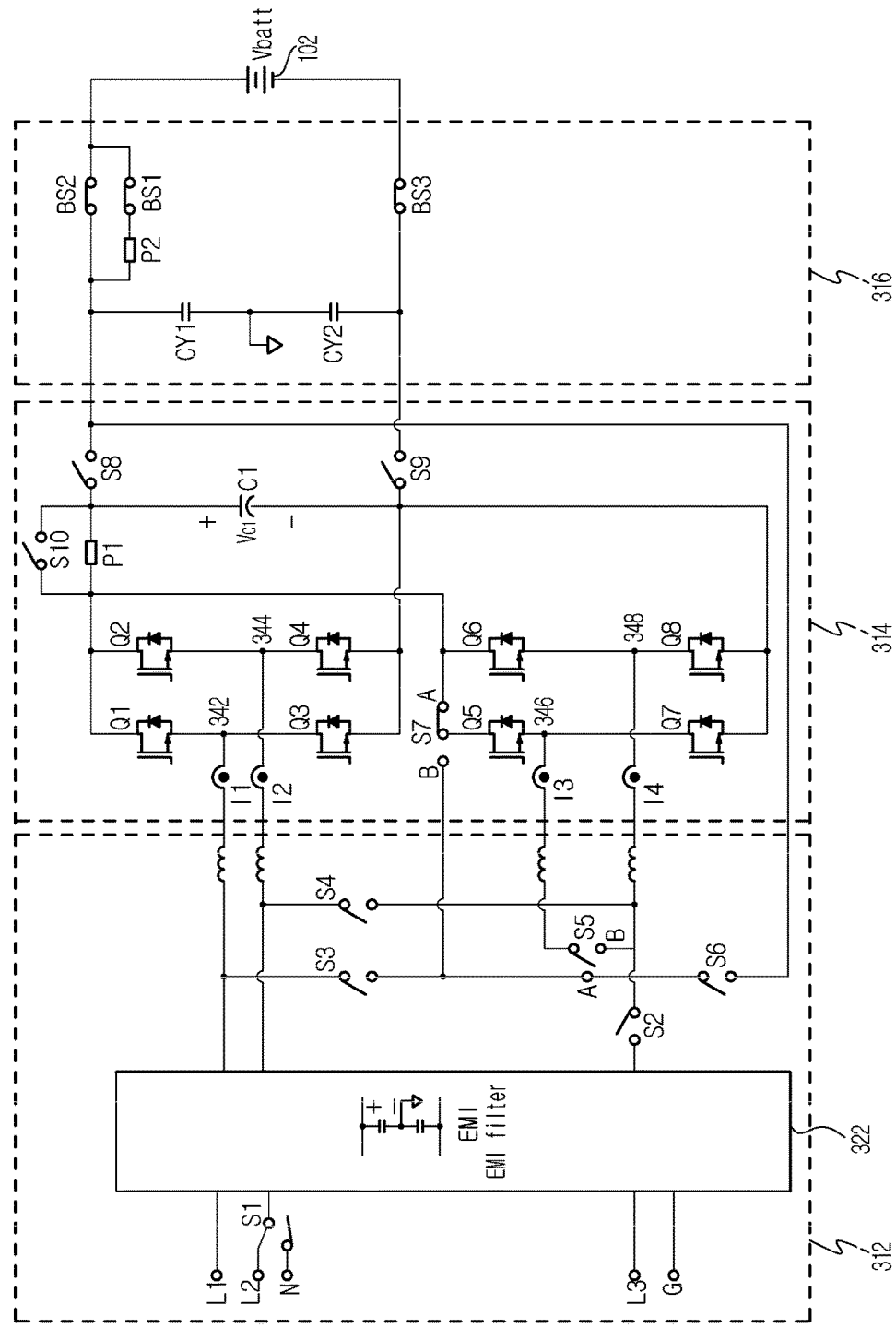
FIG. 3 is a circuit diagram illustrating an On Board Charger (OBC) in one form of the present disclosure.

FIG. 3 is a circuit diagram illustrating the On Board Charger (OBC) 202 in some forms of the present disclosure. In FIG. 3, the high-voltage battery 102 may supply power to the motor 212 through the inverter 206.

Referring to FIG. 3, the OBC 202 may include an input part 312, a boost power factor corrector 314, and a power relay assembly 316.

The input part 312 may receive AC power from an external AC power source. The input part 312 may include 5 input lines L1, L2, L3, N, and G, an EMI (Electro Magnetic Interference) filter 322, and a switch S1.

The EMI filter 322 may remove noise included in the received AC power. The EMI filter 322 may be connected to the five input lines L1, L2, L3, N, and G. AC power may be input from the external AC power source to the EMI filter 322 through the input lines L1, L2, L3, N, and G. Here, L1, L2, and L3 may be AC power input lines, N is a neutral line, and G is a ground line.

A maximum of three-phase AC power may be input to the EMI filter 322 through the AC power input lines L1, L2 and L3 from among the five input lines L1, L2, L3, N, and G. That is, three-phase AC power may be input to the EMI filter 322 through all of the AC power input lines L1, L2, and L3. Alternatively, bi-phase AC power may be input to the EMI filter 322 only through the AC power input lines L1 and L2, or single-phase AC power may be input to the EMI filter 322 only through the AC power input line L1 and the neutral line N.

The switch S1 of the input part 312 may connect any one of the AC power input line L2 and the neutral line N to the EMI filter 322. If the input AC power is three-phase AC power or bi-phase AC power, the switch S1 may be controlled in a manner that the AC power input line L2 is connected to the EMI filter 322. If the input AC power is single-phase AC power, the switch S1 may be controlled in a manner that the neutral line N is connected to the EMI filter 322.

The boost power factor corrector 314 may basically include a first full bridge circuit composed of switching elements Q1, Q2, Q3, and Q4 and a second full bridge circuit composed of switching elements Q5, Q6, Q7, and Q8. A first leg 342 disposed between the switching elements Q1 and Q3, a second leg 344 disposed between the switching elements Q2 and Q4, a third leg 346 disposed between the switching elements Q5 and Q7, and a fourth leg 348 disposed between the switching elements Q6 and Q8 may be connected to the EMI filter 322. Each of the first to fourth legs 342, 344, 346, and 348 may include an inductance.

Referring to the charging apparatus of FIG. 3, a full bridge circuit constructing the boost power factor corrector 314 may include a single group (i.e., the first full bridge circuit) composed of four switching elements Q1, Q2, Q3, and Q4 and two legs 342 and 344, and may further include another group (i.e., the second full bridge circuit) composed of four switching elements Q5, Q6, Q7, and Q8 and two legs 346 and 348. The first full bridge circuit and the second full bridge circuit may be connected in parallel between the EMI filter 322 and a capacitor C1 to be described later.

In the first full bridge circuit, the AC power input line L1 may be connected to the leg 342, and the AC power input line L2 and the neutral line N may be connected to the other leg 344. Information as to which one of the AC power input line L2 and the neutral line N is connected to the leg 344 may be decided by on/off operations of the switch S1 provided to the input part 312. If the switch S1 is turned off, the AC power input line L2 may be connected to the leg 344. If the switch S2 is turned on, the neutral line N may be connected to the leg 344.

In the second full bridge circuit, the AC power input line L2 may be connected to the leg 346 through the switches S5 and S3, and the AC power input line L3 may be connected to the leg 346 through the switches S5 and S2. Therefore, when the switch S3 is turned on and the switch S5 is connected to a contact point A, the leg 346 may be connected to the AC power input line L1. When the switch S3 is turned on, the switch S5 is connected to a contact point B, and the switch S2 is turned on, the leg 346 may be connected to the AC power input line L3. When the switch S5 is connected to the contact point B, the leg 346 and the leg 347 of the second full bridge circuit may be connected to each other. The AC power input line L2 and the neutral line N may be connected to the leg 348 of the second full bridge circuit through the switch S4, and the AC power input line L3 may be connected to the leg 348 through the switch S2. Therefore, when the switch S3 is turned on after the switch S2 is turned off, the AC power input line L2 may be connected to the leg 346. When the switch S4 is turned on after the switch S2 is turned off, the AC power input line L2 and the neutral line N may be connected to the leg 348. Information as to which one of the AC power input line L2 and the neutral line N is connected to the leg 348 may be decided by on/off operations of the switch S1. When the switch S1 is turned off, the AC power input line L2 may be connected to the leg 348. When the switch S2 is turned on, the neutral line N may be connected to the leg 348. In contrast, when the switch S2 is turned on, the AC power input line L3 may be connected to the leg 348. In this case, when the switch S4 is turned on, the AC power input line L3 may also be connected to the leg 344 of the first full bridge circuit.

One end of the switch S6 may be connected to a node at which the switch S3 is connected to the second full bridge circuit, and the other end of the switch S6 may be connected to a positive(+) electrode of the high-voltage battery 102 through switches BS1 and BS2 to be described later. Therefore, when the switches S3 and S6 are turned on, the AC power input line L1 may be connected to the positive(+) electrode of the high-voltage battery 102 through the switches BS1 and BS2. In contrast, when the switch S3 is turned off and the switch S5 is turned on, the AC power input line L1 may be connected to the positive(+) electrode of the high-voltage battery 102 through the switches BS1 and BS2.

A capacitor C1 acting as a power factor corrector (PFC) link capacitor may be provided in the boost power factor corrector 314. The capacitor C1 may be disposed between both ends of the first full bridge circuit and the second full bridge circuit.

Switches S10 and S8 may be further included in the boost power factor corrector 314. The switch S10 may be disposed between an upper end of each of the first full bridge circuit and the second full bridge circuit and the positive(+) electrode of the capacitor C1, and may also be connected in parallel to a power factor correction element P1. The switch S8 may be disposed at both ends of the capacitor C1, and may electrically interconnect the boost power factor corrector 314 and the power relay assembly 316 to be described. That is, the boost power factor corrector 314 may be electrically connected to the power relay assembly 316 through the switch S8. The boost power factor corrector 314 may also be electrically connected to both ends of the high-voltage battery 102 through the switch S8.

A switch S9 may be connected between a lower end of each of the first full bridge circuit and the second full bridge circuit and a negative(−) electrode of the high-voltage battery 102.

Capacitors CY1 and CY2, each of which acts as an equivalent modeling capacitor Y, may be connected in series to the power relay assembly 316. A node through which the capacitors CY1 and CY2 are interconnected may be grounded.

Two switches BS1 and BS2 and a single power factor element P2 may be disposed between the capacitor CY1 and the positive(+) electrode of the high-voltage battery 102. The switch BS1 and the power factor element P1 may be connected in series between the capacitor CY1 and the positive(+) electrode of the high-voltage battery 102, and the switch BS2 may be connected in parallel to this serial connection structure.

The switch BS3 may be disposed between the capacitor CY2 and the negative(−) electrode of the high-voltage battery 102.

The plurality of switches S1, S2, S3, S4, S5, S6, S7, S8, S9, S10, BS1, BS2, and BS3 included in the switch network provided in the OBC 202 may be controlled by the controller 210 shown in FIG. 2, and may be turned on or off. In some forms of the present disclosure, the high-voltage battery 102 may be charged with various kinds of AC powers through various on/off combinations of the plurality of switches S1, S2, S3, S4, S5, S6, S7, S8, S9, S10, BS1, BS2, and BS3 included in the switch network. Various kinds of AC powers will hereinafter be described with reference to FIG. 4.

Turn-on operation and turn-off operation of the switches S1, S2, S3, S4, S5, S6, S7, S8, S9, S10, BS1, BS2, and BS3 shown in FIG. 3 may be controlled by the controller 210, and turn-on operation and turn-off operation of the switching elements Q1, Q2, Q3, Q4, Q5, Q6, Q7, and Q8 shown in FIG. 3 may also be controlled by the controller 210.

Figure 4:
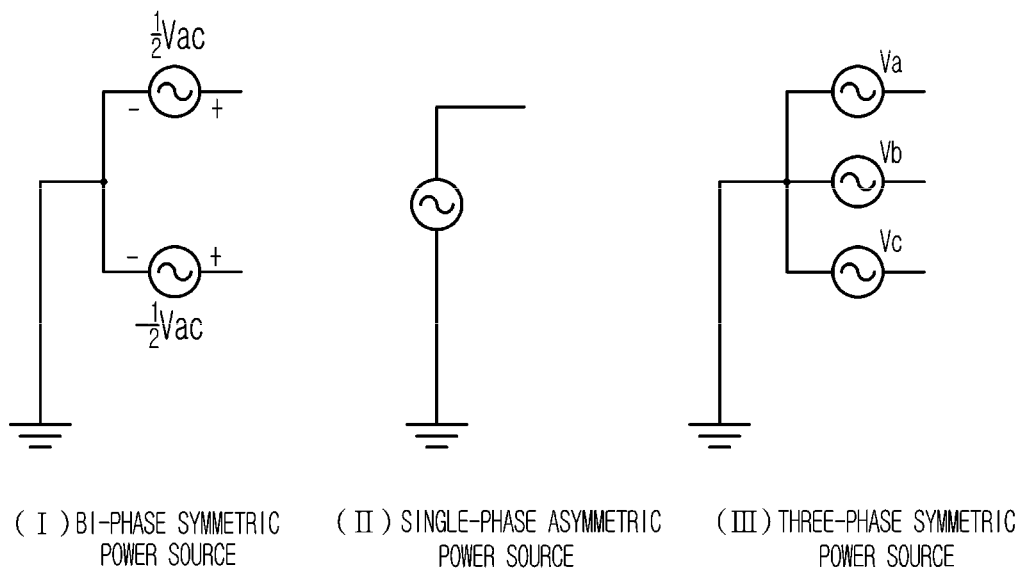
FIG. 4 is a view illustrating various kinds of power sources embedded in the OBC in one form of the present disclosure.

FIG. 4 is a view illustrating various kinds of power sources embedded in the OBC in some forms of the present disclosure.

FIG. 4(I) is a view illustrating a bi-phase symmetric power source. Referring to FIG. 4(I), the bi-phase symmetric power source may allow a power-supply voltage to be divided into two voltages 1/2 Vac and −1/2 Vac. Since two voltages 1/2 Vac and −1/2 Vac may have opposite phases, the two voltages may be referred to as a bi-phase symmetric power source. The bi-phase symmetric power source shown in FIG. 4(I) is mainly used in North America.

FIG. 4(II) is a view illustrating a single-phase asymmetric power source. Referring to FIG. 4(II), the single-phase asymmetric power source may provide a power-supply voltage formed in a single voltage (Vac) having a single phase. Since the single voltage (Vac) has a single phase, the single voltage (Vac) may be referred to as a single-phase asymmetric power source. The single-phase asymmetric power-supply shown in FIG. 4(II) is mainly used in Korea, North America, and Europe.

FIG. 4(III) is a view illustrating a three-phase symmetric power source. Referring to FIG. 4(III), the three-phase asymmetric power source may allow a power-supply voltage to be divided into three voltages Va, Vb, and Vc. Since three voltages Va, Vb, and Vc may have different phases, the three voltages may be referred to as a three-phase asymmetric power source. The three-phase asymmetric power source shown in FIG. 4(III) is mainly used in Europe.

Various kinds of AC power sources are used in individual countries as described above, such that the OBC 202 in some forms of the present disclosure aims to cope with various kinds of AC powers of the individual countries through the on/off combinations of the switch network. For example, for the bi-phase symmetric power source, a boost power factor corrector formed in a single-phase full bridge inverter type is implemented, such that the high-voltage battery 102 may be charged with power. For the single-phase asymmetric power source, a boost power factor corrector formed in a single-phase full bridge inverter type is implemented along with a buck converter, such that the high-voltage battery 102 may also be charged with power. For the three-phase symmetric power source, the three-leg boost power factor corrector is implemented along with a motor/inverter buck converter, such that the high-voltage battery 102 may be charged.

FIGS. 5 to 12 are views illustrating on/off combinations of a switch network coping with various kinds of AC power sources for use in various countries.

Figure 5:
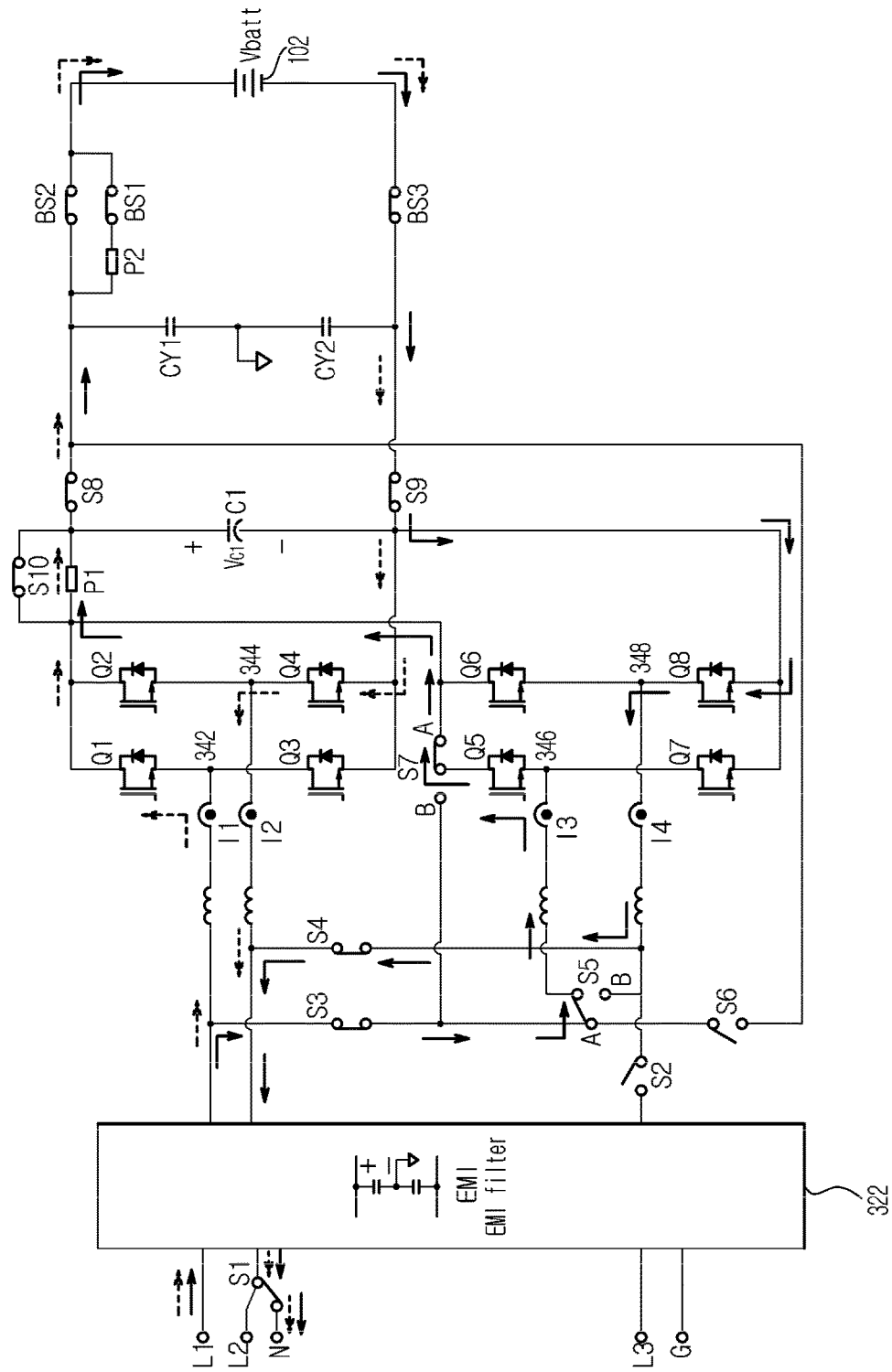
FIG. 5 is a view illustrating on/off combinations of a switch network coping with bi-phase symmetrical power sources for use in North America.
Figure 6:
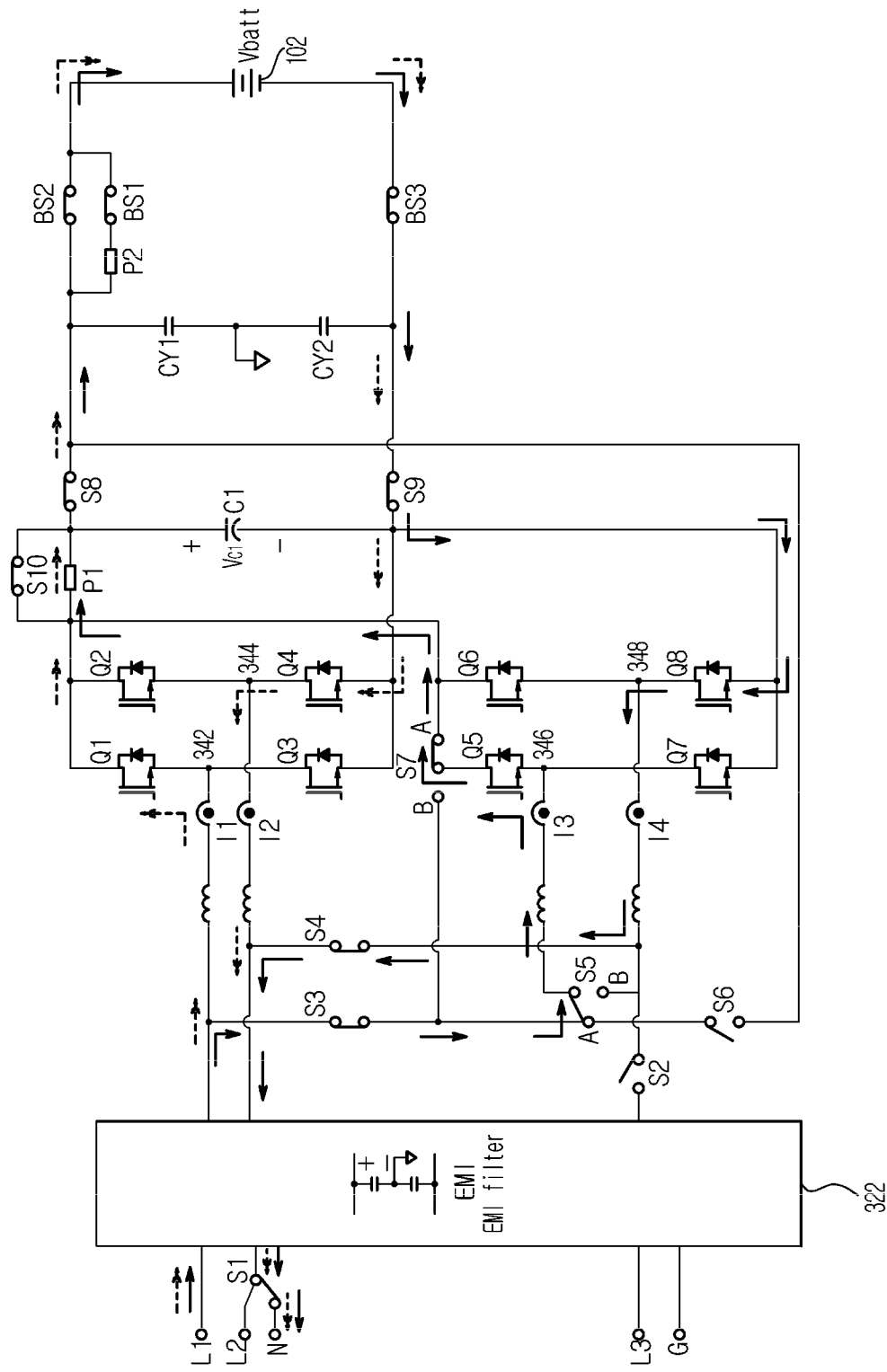
FIG. 6 is a view illustrating on/off combinations of a switch network coping with bi-phase symmetrical power sources for use in North America.

FIGS. 5 and 6 are views illustrating on/off combinations of a switch network coping with a bi-phase symmetrical power source for use in North America. Specifically, FIG. 5 is a view illustrating a method for controlling the switch network when a peak value of a voltage (Vc1) of the capacitor C1 is higher than a charge request voltage (Vbatt) of the high-voltage battery 102. FIG. 6 is a view illustrating a method for controlling the switch network when a peak value of the voltage (Vc1) of the capacitor C1 is lower than the charge request voltage (Vbatt) of the high-voltage battery 102.

Figure 7A:
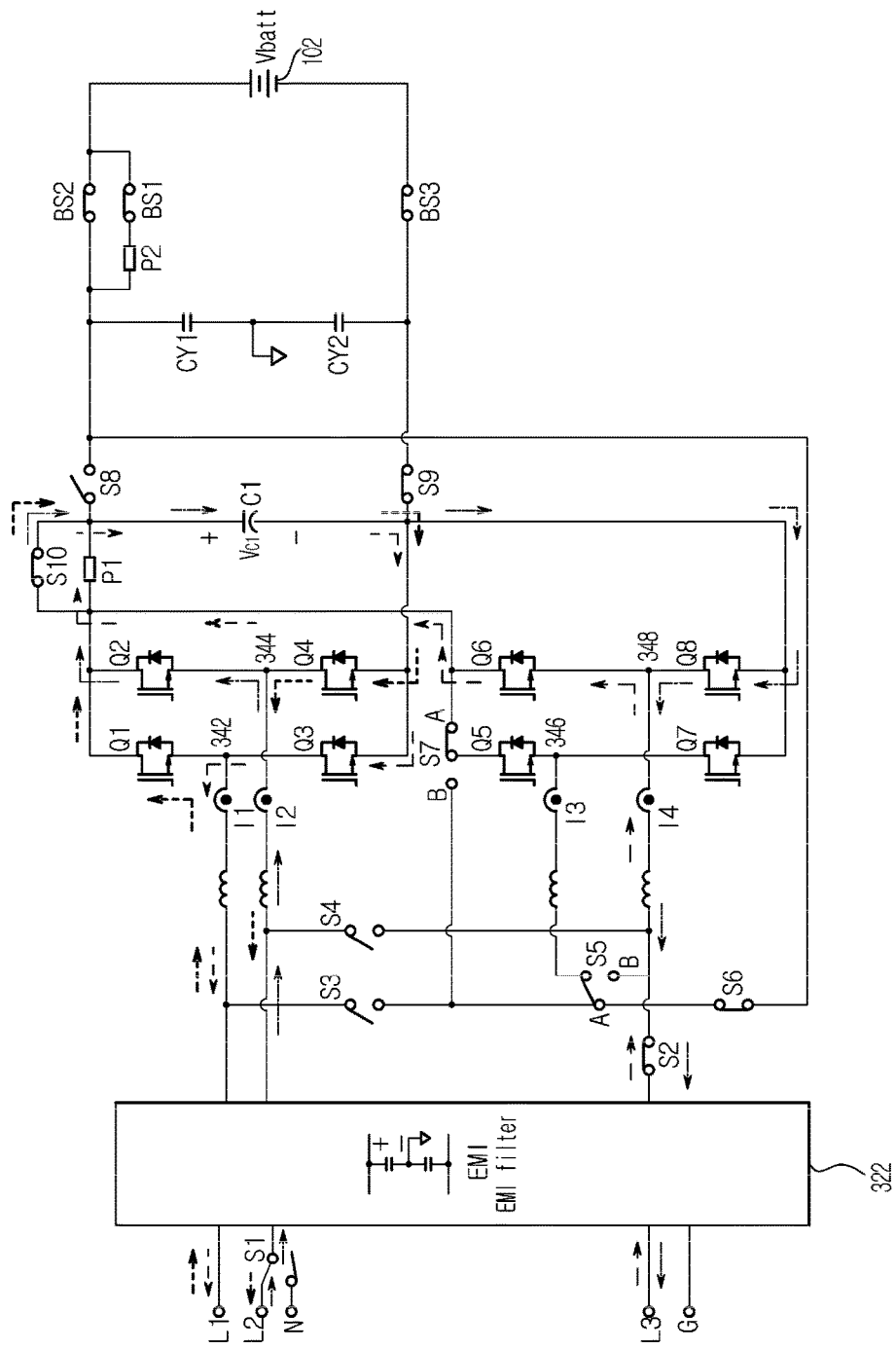
FIGS. 7A and 7B are views illustrating on/off combinations of a switch network coping with three-phase symmetrical power source for use in Europe.
Figure 7B:
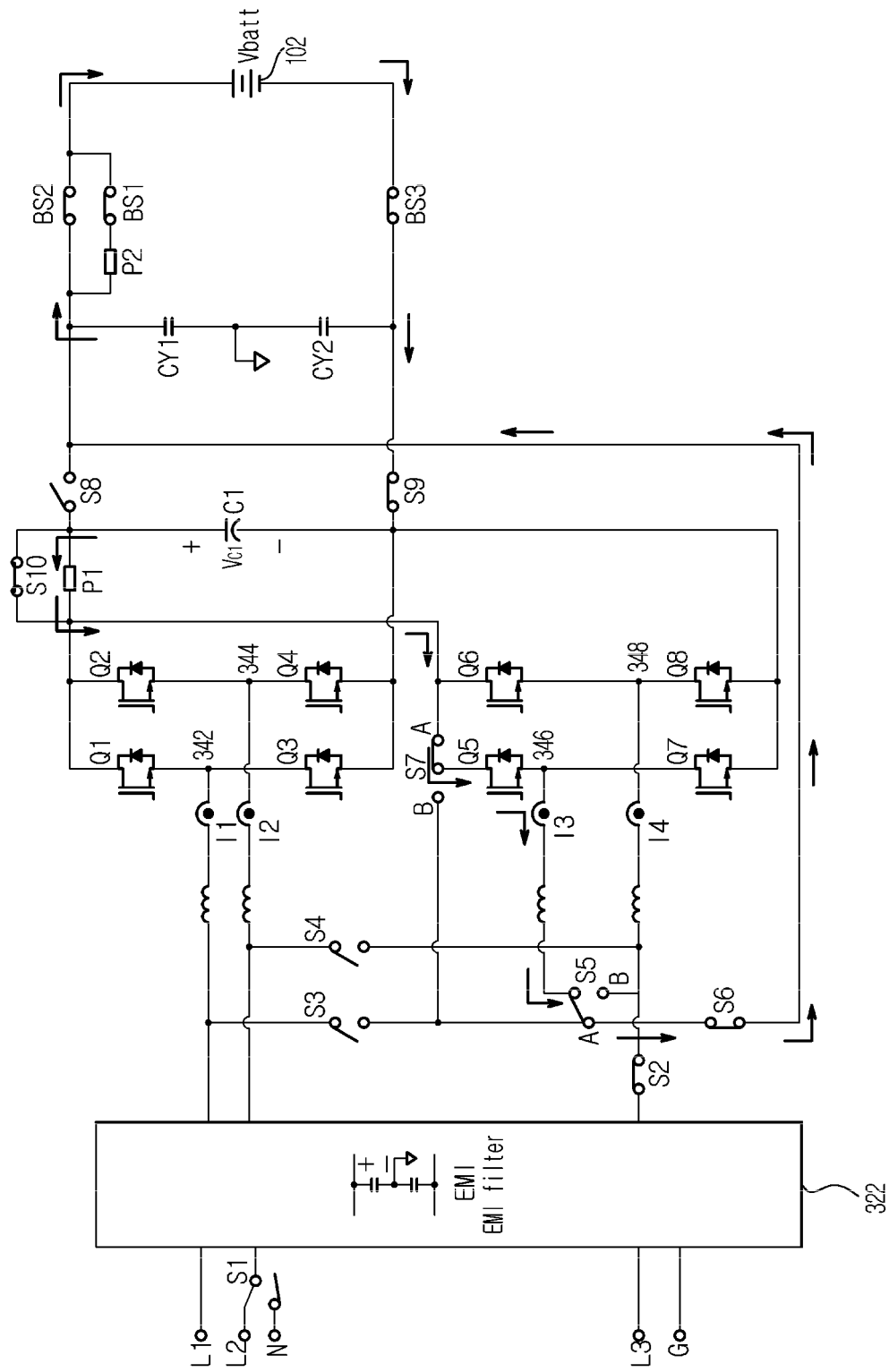
Figure 8:
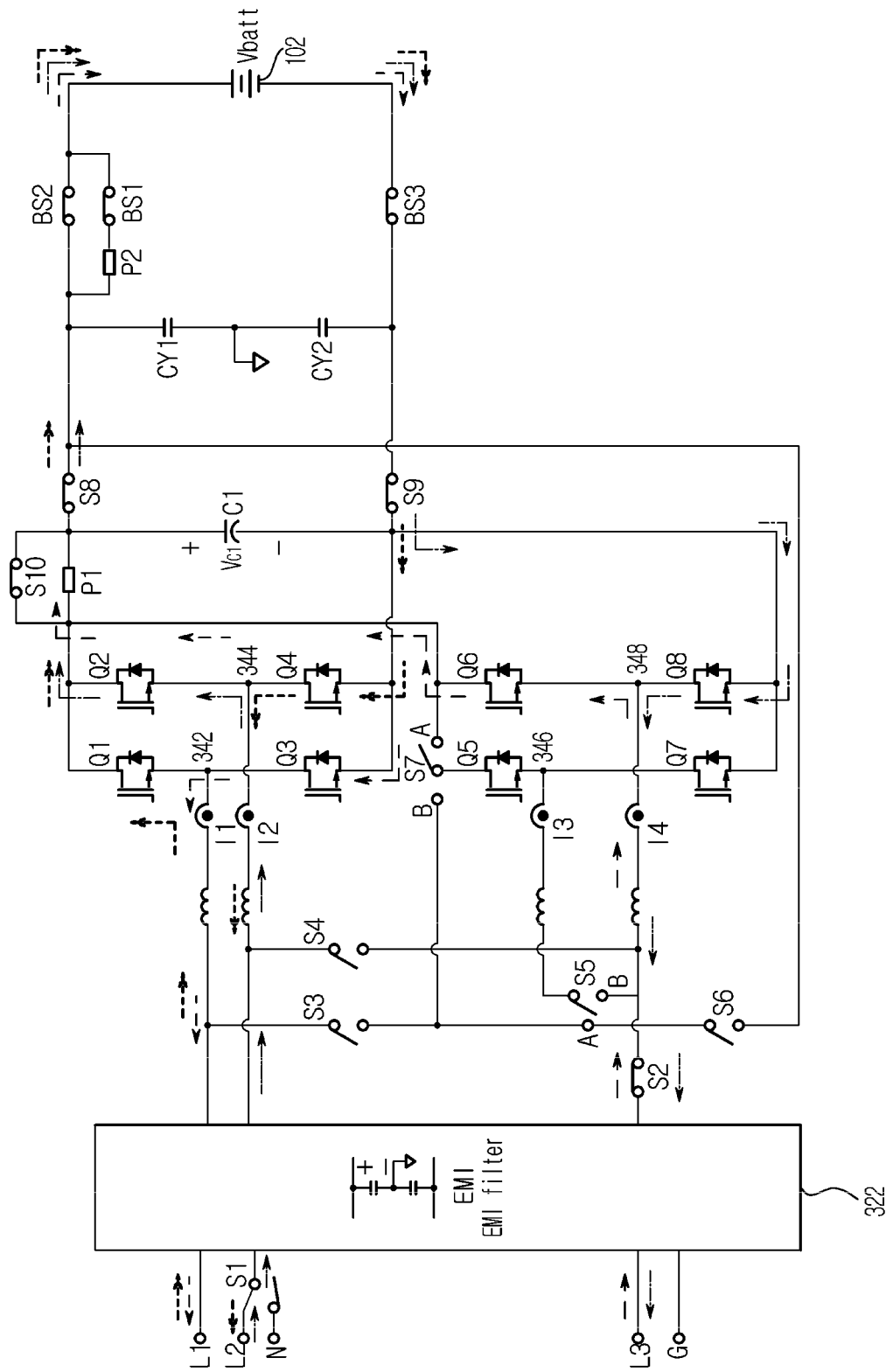
FIG. 8 is a view illustrating on/off combinations of a switch network coping with three-phase symmetrical power source for use in Europe.

FIGS. 7 and 8 are views illustrating on/off combinations of the switch network coping with three-phase symmetrical power source for use in Europe. Specifically, FIG. 7 is a view illustrating a method for controlling the switch network when a peak value of the voltage (Vc1) of the capacitor C1 is higher than the charge request voltage (Vbatt) of the high-voltage battery 102. FIG. 8 is a view illustrating a method for controlling the switch network when a peak value of the voltage (Vc1) of the capacitor C1 is lower than the charge request voltage (Vbatt) of the high-voltage battery 102.

Figure 9:
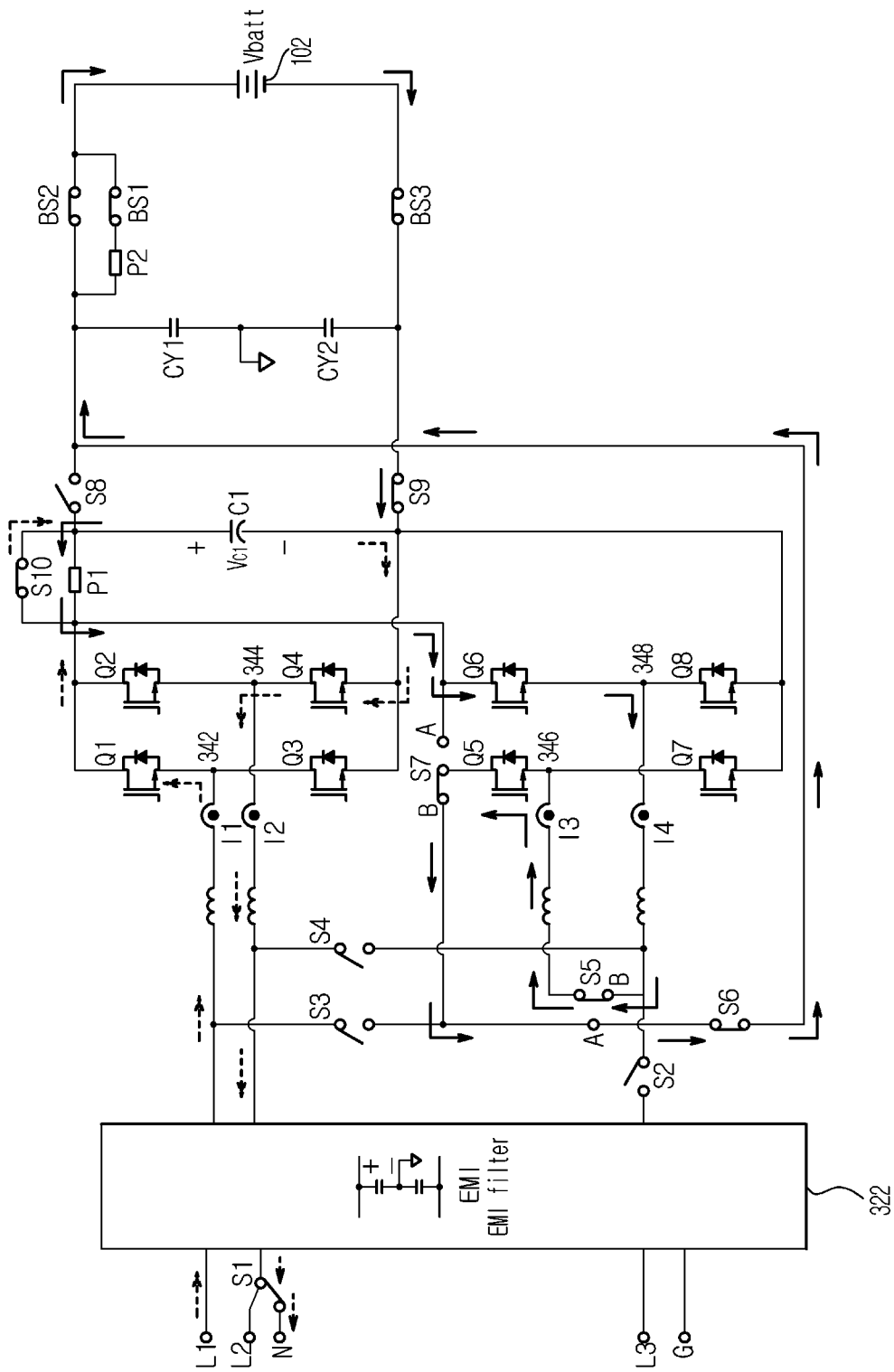
FIG. 9 is a view illustrating on/off combinations of a switch network coping with single-phase asymmetrical power source for use in Korea and Europe.
Figure 10:
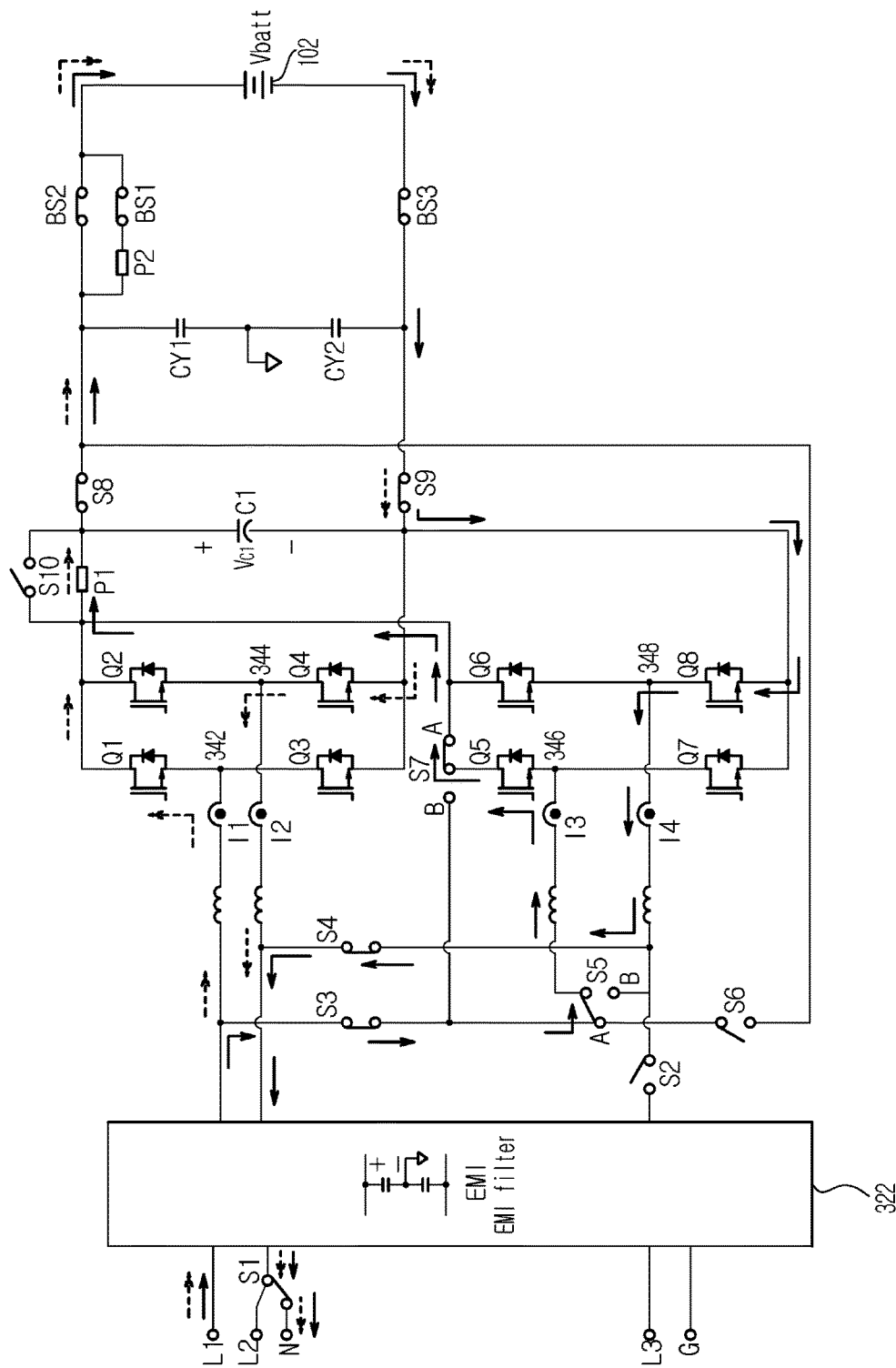
FIG. 10 is a view illustrating on/off combinations of a switch network coping with single-phase asymmetrical power source for use in Korea and Europe.

FIGS. 9 and 10 are views illustrating on/off combinations of the switch network coping with a single-phase asymmetrical power source for use in Korea and Europe. Specifically, FIG. 9 is a view illustrating a method for controlling the switch network when a peak value of the voltage (Vc1) of the capacitor C1 is higher than the charge request voltage (Vbatt) of the high-voltage battery 102. FIG. 10 is a view illustrating a method for controlling the switch network when a peak value of the voltage (Vc1) of the capacitor C1 is lower than the charge request voltage (Vbatt) of the high-voltage battery 102.

Figure 11:
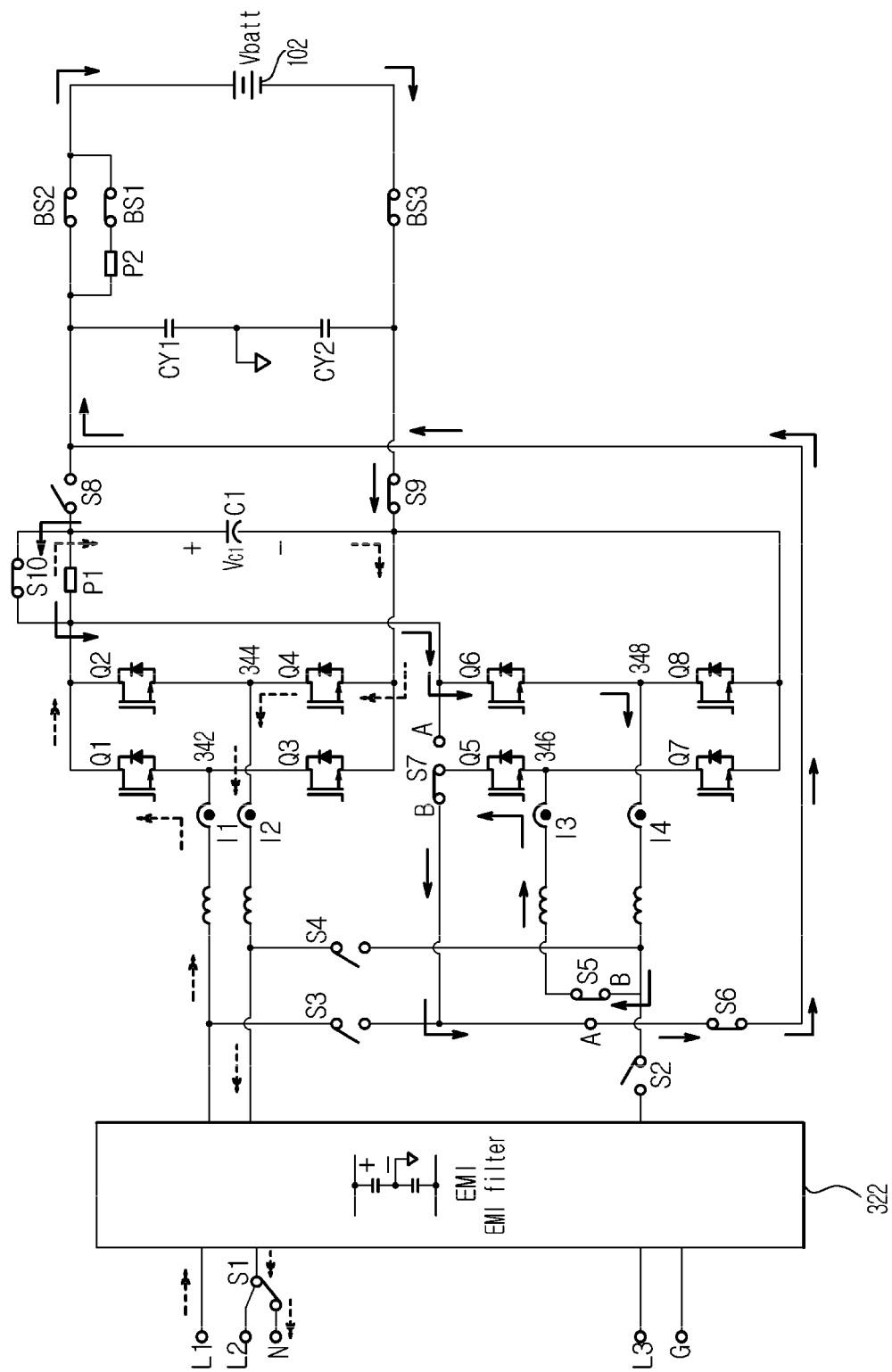
FIG. 11 is a view illustrating on/off combinations of a switch network coping with single-phase asymmetrical power source for use in North America.
Figure 12:
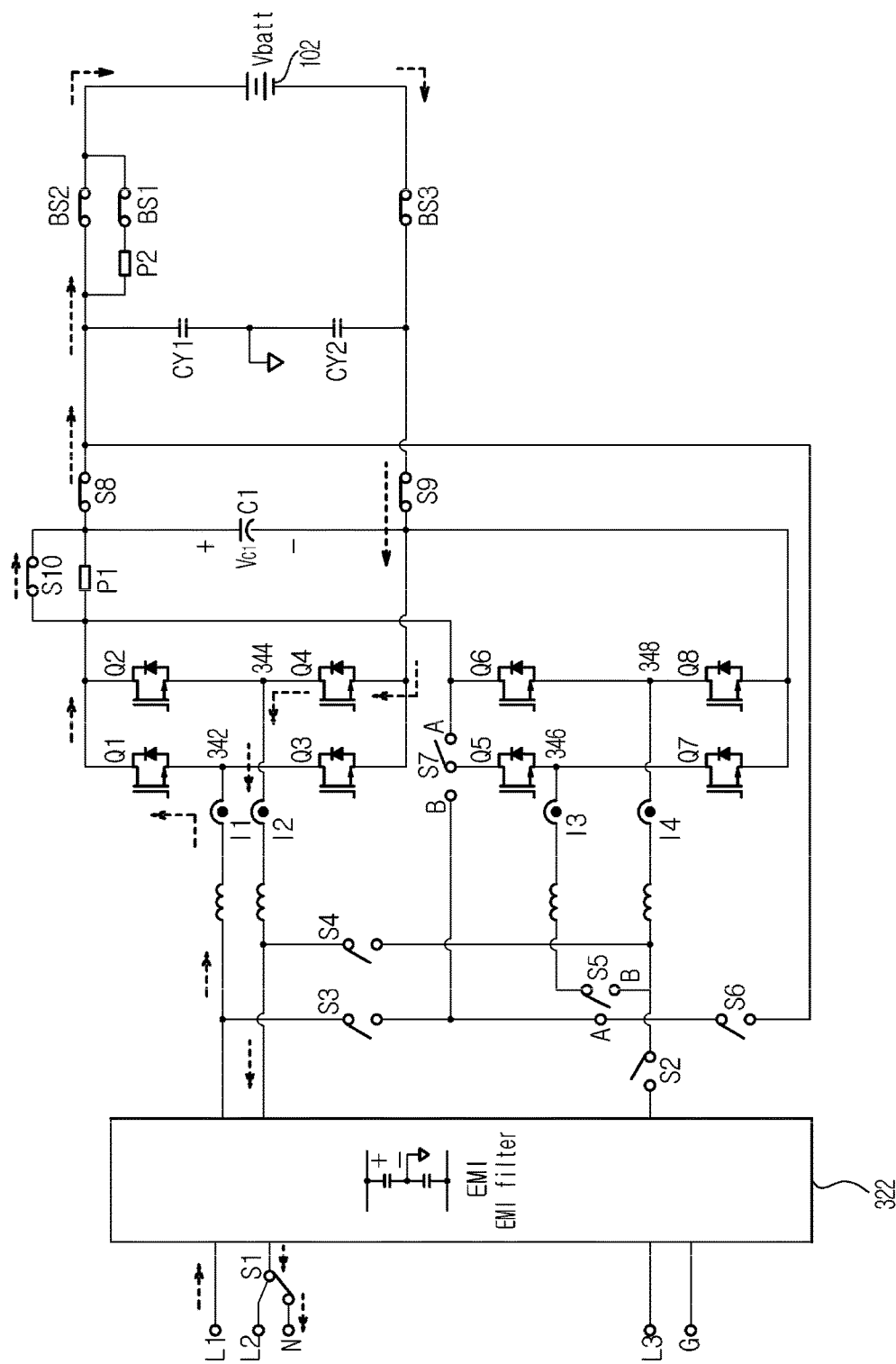
FIG. 12 is a view illustrating on/off combinations of a switch network coping with single-phase asymmetrical power source for use in North America.

FIGS. 11 and 12 are views illustrating on/off combinations of the switch network coping with a single-phase asymmetrical power source for use in North America. Specifically, FIG. 11 is a view illustrating a method for controlling the switch network when a peak value of the voltage (Vc1) of the capacitor C1 is much lower than the charge request voltage (Vbatt) of the high-voltage battery 102. FIG. 12 is a view illustrating a method for controlling the switch network when a peak value of the voltage (Vc1) of the capacitor C1 is lower than the charge request voltage (Vbatt) of the high-voltage battery 102.

FIG. 5 is a view illustrating on/off combinations of the switch network coping with a bi-phase symmetrical power source for use in North America. Specifically, FIG. 5 is a view illustrating a method for controlling the switch network when the peak voltage of the voltage (Vc1) of the capacitor C1 is higher than the charge request voltage (Vbatt) of the high-voltage battery 102.

In FIG. 5, the on/off combinations of the respective switches S1, S2, S3, S4, S5, S6, S7, S8, S9, S10, BS1, BS2, and BS3 for use in the switch network are as follows.

S1: ON, S2: OFF, S3: OFF, S4: OFF, S5: B,
S6: ON, S7: B, S8: OFF, S9: ON, S10: ON,
BS1: ON, BS2: ON, BS3: ON

The switch S1 may be turned on to connect the neutral line N to the EMI filter 322, such that bi-phase symmetric AC power may be input to the electric vehicle through the AC power input line L1 and the neutral line N. The switch S10 may also be turned on, such that the capacitor C1 may be charged through the turned-on switches S1 and S10. The switches S2, S3 and S4 are turned on, such that the AC power input lines L1, L2 and L3 are not connected to the legs 346 and 348 of the second full bridge circuit. However, the switch S5 is connected to the contact point B, such that the leg 346 is connected to the leg 348. Since the switch S6 is turned on and the switch S7 is connected to the contact point B, the legs 346 and 348 of the second full bridge circuit may be connected to the positive(+) electrode of the high-voltage battery 102 through the switching element Q5. The switch S8 may be turned off.

In addition, the switching elements Q1, Q4, and Q5 of the boost power factor corrector 314 may be turned on.

By the above-mentioned on/off combinations of the switch network, the capacitor C1 may be charged through the first full bridge circuit along a path denoted by a dotted arrow of FIG. 5. A charge voltage of the capacitor C1 may charge the high-voltage battery 102 through the second full bridge circuit along a path denoted by a solid arrow of FIG. 5. The reason why the operation for charging the high-voltage battery 102 by the charge voltage of the capacitor C1 is performed is that a peak voltage of the voltage (Vc1) of the capacitor C1 is higher than the charge request voltage (Vbatt) of the high-voltage battery 102.

Since a single-phase full-bridge-inverter-type boost power factor corrector and a buck converter mode are implemented by the above-mentioned on/off combinations of the switch network, the implementation result may cope with the bi-phase symmetric power source used in North America.

FIG. 6 is a view illustrating on/off combinations of the switch network coping with a bi-phase symmetrical power source for use in North America. Specifically, FIG. 6 is a view illustrating a method for controlling the switch network when the peak voltage of the voltage (Vc1) of the capacitor C1 is lower than the charge request voltage (Vbatt) of the high-voltage battery 102.

In FIG. 6, the on/off combinations of the respective switches S1, S2, S3, S4, S5, S6, S7, S8, S9, S10, BS1, BS2, and BS3 for use in the switch network are as follows.

S1: ON,  S2: OFF,  S3: ON,  S4: ON,  S5: ON(A),
S6: OFF,  S7: ON(A),  S8: ON,  S9: ON,  S10: ON,
BS1: ON,  BS2: ON,  BS3: ON

The switch S1 may be turned on to connect the neutral line N to the EMI filter 322, such that bi-phase symmetric AC power may be input to the electric vehicle through the AC power input line L1 and the neutral line N. The switches S3, S4, S5, S7, S8, S9, and S10 are turned on whereas the switches S2 and S6 are turned off. As a result, the leg 346 of the second full bridge circuit may be connected to the AC power input line L1 through the turned-on switch S3 and the switch S5 connected to the contact point A, and the leg 348 may be connected to the connected to the neutral line N through the turned-on switches S1 and S4.

Since the switch S7 is connected to the contact point A, the leg 346 of the first full bridge circuit is connected to the positive(+) electrode of the high-voltage battery 102 through the switching element Q5 and the switches S10 and S8.

In addition, the switching elements Q1, Q4, Q5 and Q8 of the boost power factor corrector 314 may be turned on.

By the above-mentioned on/off combinations of the switch network, the high-voltage battery 102 may be directly charged through the first full bridge circuit along a path denoted by a dotted arrow of FIG. 6. In addition, the high-voltage battery 102 may also be directly charged through the second full bridge circuit along a path denoted by a solid arrow of FIG. 6. The reason why the operation for charging the high-voltage battery 102 by the bi-phase symmetric AC power received through the EMI filter 322 is performed is that the peak voltage of the voltage (Vc1) of the capacitor C1 is lower than the charge request voltage (Vbatt) of the high-voltage battery 102.

Since a single-phase full-bridge interleave/parallel inverter-type boost power factor corrector is implemented by the above-mentioned on/off combinations of the switch network, the implementation result may cope with the bi-phase symmetric power source used in North America.

FIG. 7 is a view illustrating on/off combinations of the switch network coping with a three-phase symmetrical power source for use in Europe. Specifically, FIG. 7 is a view illustrating a method for controlling the switch network when the peak voltage of the voltage (Vc1) of the capacitor C1 is higher than the charge request voltage (Vbatt) of the high-voltage battery 102.

In FIG. 7, the on/off combinations of the respective switches S1, S2, S3, S4, S5, S6, S7, S8, S9, S10, BS1, BS2, and BS3 for use in the switch network are as follows.

S1: OFF,  S2: ON,  S3: OFF,  S4: OFF,  S5: ON(A),
S6: ON,  S7: ON(A),  S8: OFF,  S9: ON,  S10: ON,
BS1: ON,  BS2: ON,  BS3: ON

The switch S1 may be turned off in a manner that the AC power input line L2 is connected to the EMI filter 322. The switches S3, S4, S7, and S8 may be turned off, the switches S2, S6, S9, and S10 may be turned on, and each of the switches S5 and S7 may be connected to the contact point A. Since the switches S3 and S4 are turned off, the AC power input line L1 is connected to the leg 342 of the first full bridge circuit and the AC power input line L2 is connected to the other leg 344 (without being connected to the second full bridge circuit). Since the switches S2 and S6 are turned on and each of the switches S5 and S7 is connected to the contact point A, the leg 346 of the second full bridge circuit is connected to the positive(+) electrode of the high-voltage battery 102 and the other leg 348 is connected to the AC power input line L3.

In FIG. 7A, the dotted arrow may denote flow of single-phase power received through the AC power input line L1 from among the three-phase AC power, and the one-dot chain arrow may denote flow of single-phase power received through the AC power input line L2, and the two-dot chain arrow may denote flow of single-phase power received through the AC power input line L3. As a result, the capacitor C1 may be charged with three-phase AC power. In FIG. 7B, the solid arrow may denote a path along which the high-voltage battery 102 is charged with power stored in the capacitor C1. For this purpose, the switching elements Q1, Q2, Q3, Q4, Q6, and Q8 of the boost power factor corrector 314 may be selectively turned on to receive power having each phase.

By the above-mentioned on/off combinations of the switch network, the capacitor C1 may be charged along the path shown in FIG. 7A. The charge voltage of the capacitor C1 may charge the high-voltage battery 102 along a path denoted by the solid arrow of FIG. 7B. The reason why the operation for charging the high-voltage battery 102 by the charge voltage of the capacitor C1 is performed is that the peak voltage of the voltage (Vc1) of the capacitor C1 is higher than the charge request voltage (Vbatt) of the high-voltage battery 102.

By the above-mentioned on/off combinations of the switch network, the three-phase boost power factor corrector and the buck converter mode are implemented, such that the implementation result may cope with the three-phase symmetric power source used in Europe.

FIG. 8 is a view illustrating on/off combinations of the switch network coping with a three-phase symmetrical power source for use in Europe. Specifically, FIG. 8 is a view illustrating a method for controlling the switch network when the peak voltage of the voltage (Vc1) of the capacitor C1 is lower than the charge request voltage (Vbatt) of the high-voltage battery 102.

In FIG. 8, the on/off combinations of the respective switches S1, S2, S3, S4, S5, S6, S7, S8, S9, S10, BS1, BS2, and BS3 for use in the switch network are as follows.

S1: OFF,  S2: ON,  S3: OFF,  S4: OFF,  S5: OFF,  S6: OFF
S7: OFF,  S8: ON,  S9: ON,  S10: ON
BS1 : ON,  BS2: ON,  BS3: ON

The switch S1 may be turned off in a manner that the AC power input line L2 is connected to the EMI filter 322. The switches S3, S4, S5, S6, and S7 are turned off, and the switches S2 and S8 are turned on. The switches S5 and S7 are not connected to any one of the contact points A and B. Since the switches S3 and S4 are turned off, the AC power input line L2 is connected to the leg 342 of the first full bridge circuit, the AC power input line L2 is connected to the other leg 344 (without being connected to the second full bridge circuit). In addition, the switch S2 is turned on such that the leg 348 of the second full bridge circuit is connected to the AC power input line L3.

In FIG. 8, the dotted arrow may denote flow of single-phase power received through the AC power input line L1 from among the three-phase AC power, and the one-dot chain arrow may denote flow of single-phase power received through the AC power input line L2, and the two-dot chain arrow may denote flow of single-phase power received through the AC power input line L3. The high-voltage battery 102 may be directly charged with such three-phase AC power. For this purpose, the switching elements Q1, Q2, Q3, Q4, Q6, and Q8 of the boost power factor corrector 314 may be selectively turned on to receive power having each phase.

By the above-mentioned on/off combinations of the switch network, the high-voltage battery 102 may be directly charged along the path shown in FIG. 8. The reason why the operation for charging the high-voltage battery 102 by the three-phase symmetric AC power received through the EMI filter 322 is performed is that the peak voltage of the voltage (Vc1) of the capacitor C1 is lower than the charge request voltage (Vbatt) of the high-voltage battery 102.

By the above-mentioned on/off combinations of the switch network, the three-phase boost power factor corrector is implemented, such that the implementation result may cope with the three-phase symmetric power source used in Europe.

FIG. 9 is a view illustrating on/off combinations of the switch network coping with a single-phase asymmetrical power source for use in Korea and Europe. Specifically, FIG. 9 is a view illustrating a method for controlling the switch network when the peak voltage of the voltage (Vc1) of the capacitor C1 is higher than the charge request voltage (Vbatt) of the high-voltage battery 102.

In FIG. 9, the on/off combinations of the respective switches S1, S2, S3, S4, S5, S6, S7, S8, S9, S10, BS1, BS2, and BS3 for use in the switch network are as follows.

S1: ON, S2: OFF, S3: OFF, S4: OFF, S5: B,
S6: ON, S7: B, S8: OFF, S9: ON, S10: ON
BS1: ON, BS2: ON, BS3: ON

The switch S1 may be turned on to connect the neutral line N to the EMI filter 322, such that bi-phase symmetric AC power may be input to the electric vehicle through the AC power input line L1 and the neutral line N. Since the switch S10 is turned on, the capacitor C1 may be charged through the turned-on switches S1 and S10. Since the switches S2, S3, and S4 are turned off, the AC power input lines L1, L2, and L3 are not connected to the legs 346 and 348 of the second full bridge circuit. However, the switch S5 is connected to the contact point B, such that the leg 346 and the other leg 348 are connected to each other. In addition, since the switch S6 is turned on and the switch S7 is connected to the contact point B, the legs 346 and 348 of the second full bridge circuit may be connected to the positive (+) electrode of the high-voltage battery 102 through the switching element Q5. The switch S8 may be turned off.

In addition, the switching elements Q1, Q4, Q5, and Q6 of the boost power factor corrector 314 may be turned on.

By the above-mentioned on/off combinations of the switch network, the capacitor C1 may be charged through the first full bridge circuit along a path denoted by a dotted arrow of FIG. 9. The charge voltage of the capacitor C1 may charge the high-voltage battery 102 through the second full bridge circuit along a path denoted by a solid arrow of FIG. 9. The reason why the operation for charging the high-voltage battery 102 by the charge voltage of the capacitor C1 is performed is that the peak voltage of the voltage (Vc1) of the capacitor C1 is higher than the charge request voltage (Vbatt) of the high-voltage battery 102.

By the above-mentioned on/off combinations of the switch network, the single-phase full-bridge-inverter-type boost power factor corrector and the buck converter mode are implemented, such that the implementation result may cope with the single-phase asymmetric power source used in Korea and Europe.

FIG. 10 is a view illustrating on/off combinations of the switch network coping with single-phase asymmetrical power source for use in Korea and Europe. Specifically, FIG. 10 is a view illustrating a method for controlling the switch network when the peak voltage of the voltage (Vc1) of the capacitor C1 is lower than the charge request voltage (Vbatt) of the high-voltage battery 102.

In FIG. 10, the on/off combinations of the respective switches S1, S2, S3, S4, S5, S6, S7, S8, S9, S10, BS1, BS2, and BS3 for use in the switch network are as follows.

S1: ON, S2: OFF, S3: ON, S4: ON, S5: ON(A),
S6: OFF, S7: ON(A), S8: ON, S9: ON, S10: ON
BS1: ON, BS2: ON, BS3: ON

The switch S1 may be turned on to connect the neutral line N to the EMI filter 322, such that bi-phase symmetric AC power may be input to the electric vehicle through the AC power input line L1 and the neutral line N. Although the switches S2 and S6 are turned off, the switches S3, S4, S5, S7, S8, S9, and S10 are turned on. As a result, the leg 346 of the second full bridge circuit may be connected to the AC power input line L2 through the turned-on switch S3 and the switch S5 connected to the contact point A, and the leg 348 may be connected to the neutral line N through the switches S1 and S4.

The switch S7 is connected to the contact point A, such that leg 346 of the first full bridge circuit is connected to the positive(+) electrode of the high-voltage battery 102 through the switching element Q5 and the switches S10 and S8.

In addition, the switching elements Q1, Q4, Q5, and Q6 of the boost power factor corrector 314 may be turned on.

By the above-mentioned on/off combinations of the switch network, the high-voltage battery 102 may be charged along a path denoted by a dotted arrow of FIG. 10. In addition, the high-voltage battery 102 may also be charged through the second full bridge circuit along a path denoted by a solid arrow of FIG. 10. The reason why the operation for charging the high-voltage battery 102 by the AC power received through the EMI filter 322 is performed is that the peak voltage of the voltage (Vc1) of the capacitor C1 is lower than the charge request voltage (Vbatt) of the high-voltage battery 102.

By the above-mentioned on/off combinations of the switch network, the single-phase full-bridge interleave-parallel inverter-type boost power factor corrector is implemented, such that the implementation result may cope with the single-phase symmetric power source used in Korea and Europe.

FIG. 11 is a view illustrating on/off combinations of the switch network coping with single-phase asymmetrical power source for use in North America. Specifically, FIG. 11 is a view illustrating a method for controlling the switch network when the peak voltage of the voltage (Vc1) of the capacitor C1 is much lower than the charge request voltage (Vbatt) of the high-voltage battery 102.

In FIG. 11, the on/off combinations of the respective switches S1, S2, S3, S4, S5, S6, S7, S8, S9, S10, BS1, BS2, and BS3 for use in the switch network are as follows.

S1: ON, S2: OFF, S3: OFF, S4: OFF, S5: ON(B),
S6: ON, S7: ON(B), S8: OFF, S9: ON, S10: ON
BS1: ON, BS2: ON, BS3: ON

The switch S1 may be turned on to connect the neutral line N to the EMI filter 322, such that bi-phase symmetric AC power may be input to the electric vehicle through the AC power input line L1 and the neutral line N. Since the switch S10 is also turned on, the capacitor C1 may be charged with the turned-on switches S1 and S10. The switches S2, S3, and S4 are turned off, such that the AC power input lines L1, L2, and L3 are not connected to the legs 346 and 348 of the second full bridge circuit. However, the switch S5 is connected to the contact point B, such that the leg 346 and the other leg 348 are connected to each other. In addition, since the switch S6 is turned on and the switch S7 is connected to the contact point B, the legs 346 and 348 of the second full bridge circuit may be connected to the positive(+) electrode of the high-voltage battery 102 through the switching element Q5. The switch S8 may be turned off.

In addition, the switching elements Q1, Q4, Q5, and Q6 of the boost power factor corrector 314 may be turned on.

By the above-mentioned on/off combinations of the switch network, the capacitor C1 may be charged through the first full bridge circuit along a path denoted by a dotted arrow of FIG. 11. The charge voltage of the capacitor C1 may charge the high-voltage battery 102 through the second full bridge circuit along a path denoted by a solid arrow of FIG. 11. The reason why the operation for charging the high-voltage battery 102 by the charge voltage of the capacitor C1 is performed is that the peak voltage of the voltage (Vc1) of the capacitor C1 is much lower than the charge request voltage (Vbatt) of the high-voltage battery 102.

By the above-mentioned on/off combinations of the switch network, the single-phase full-bridge-inverter-type boost power factor corrector and a full-bridge boost converter mode are implemented, such that the implementation result may cope with the single-phase asymmetric power source used in North America.

FIG. 12 is a view illustrating on/off combinations of the switch network coping with single-phase asymmetrical power source for use in North America. Specifically, FIG. 12 is a view illustrating a method for controlling the switch network when the peak voltage of the voltage (Vc1) of the capacitor C1 is lower than the charge request voltage (Vbatt) of the high-voltage battery 102.

In FIG. 12, the on/off combinations of the respective switches S1, S2, S3, S4, S5, S6, S7, S8, S9, S10, BS1, BS2, and BS3 for use in the switch network are as follows.

S1: ON, S2: OFF, S3: OFF, S4: OFF, S5: OFF,
S6: OFF, S7: OFF, S8: ON, S9: ON, S10: ON
BS1: ON, BS2: ON, BS3: ON

The switch S1 may be turned on to connect the neutral line N to the EMI filter 322, such that AC power may be input to the electric vehicle through the AC power input line L1 and the neutral line N. As a result, the leg 342 of the first full bridge circuit is connected to the AC power input line L1, and the leg 344 is connected to the neutral line N. The second full bridge circuit is not connected to the AC power input line.

In addition, the switching elements Q1 and Q4 of the boost power factor corrector 314 may be turned on.

By the above-mentioned on/off combinations of the switch network, the high-voltage battery 102 may be directly charged along a path denoted by a dotted arrow of FIG. 12. The reason why the operation for charging the high-voltage battery 102 by the bi-phase symmetric AC power received through the EMI filter 322 is performed is that the peak voltage of the voltage (Vc1) of the capacitor C1 is lower than the charge request voltage (Vbatt) of the high-voltage battery 102.

By the above-mentioned on/off combinations of the switch network, the single-phase full-bridge-inverter-type boost power factor corrector is implemented, such that the implementation result may cope with the single-phase asymmetric power source used in North America.

As is apparent from the above description, the charging apparatus for the electric vehicle in some forms of the present disclosure has a small and simple structure, and charges a battery of the electric vehicle upon receiving from various kinds of power sources.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:
1. A charging apparatus for an electric vehicle comprising:
an alternating current (AC) power input configured to receive at least one AC input power from single-phase AC power or multi-phase AC power;
a power factor corrector having a plurality of full bridge circuits configured to receive the AC input power through the AC power input;
a link capacitor configured to be charged through the power factor corrector;
a switch network comprising:
a first switch S1 configured to connect at least one of an AC power input line of the AC power input or a neutral line of the AC power input to the power factor corrector; and
a second switch configured to selectively connect the AC power input to the power factor corrector or the link capacitor; and
a controller configured to control the power factor corrector and the switch network based on a condition of the AC input power,
wherein the second switch comprises a plurality of switches S3, S4, S5, S6 and S7 that are configured to selectively connect at least one full bridge circuit from among the plurality of full bridge circuits to a positive (+) electrode of a battery.

2. The charging apparatus of claim 1, wherein the plurality of full bridge circuits comprises a first full bridge circuit and a second full bridge circuit.

3. The charging apparatus of claim 2, wherein:
a first leg of the first full bridge circuit is connected to a first AC power input line of the AC power input; and
a second leg of the first full bridge circuit is selectively connected, through the first switch S1, to at least one of a second AC power input line of the AC power input or the neutral line of the AC power input.

4. The charging apparatus of claim 3, wherein:
a first leg of the second full bridge circuit is connected to a third AC power input line of the AC power input through a combination of a third switch S2 and a fourth switch S5; and
a second leg of the second full bridge circuit is connected to the third AC power input line of the AC power input through the third switch S2.

5. The charging apparatus of claim 4, wherein the switch network further comprises:
a fifth switch S3, wherein one end of the fifth switch S3 is connected to the first leg of the first full bridge circuit; and
a sixth switch S4, wherein one end of the sixth switch S4 is connected to the second leg of the first full bridge circuit.

6. The charging apparatus of claim 5, wherein the switch network further comprises:
a seventh switch S6 disposed between another end of the fifth switch S3 and the positive(+) electrode of the battery.

7. The charging apparatus of claim 6, wherein the switch network further comprises:
an eighth switch S7 configured to be switched among an upper end of the second full bridge circuit, the another end of the fifth switch S3, and an upper end of the first full bridge circuit.

8. The charging apparatus of claim 7, wherein the switch network further comprises:
a ninth switch S8 and a tenth switch S9 configured to connect each end of the link capacitor to the positive(+) electrode of the battery and a negative(−) electrode of the battery.

9. The charging apparatus of claim 8, wherein the switch network further comprises:
an eleventh switch S10 configured to connect the upper end of the first full bridge circuit to one end of the link capacitor.

10. The charging apparatus of claim 5, wherein the fourth switch S5 is configured to switch the other end of the fifth switch S3 and a space between the first leg of the second full bridge circuit and the second leg of the second full bridge circuit.

11. The charging apparatus of claim 1, wherein the condition of the AC input power comprises a multi-phase condition of the AC input power and a single-phase condition of the AC input power.

12. The charging apparatus of claim 1, wherein the condition of the AC input power comprises a symmetric power condition of the AC input power and an asymmetric power condition of the AC input power.

13. A charging apparatus for an electric vehicle comprising:
an alternating current (AC) power input configured to receive at least one AC input power from single-phase AC power or multi-phase AC power;
a power factor corrector having a first full bridge circuit and a second full bridge circuit, each of which is configured to receive the AC input power through the AC power input;
a link capacitor configured to be charged through the power factor corrector;
a switch network comprising:
a first switch S1 configured to connect at least one of an AC power input line of the AC power input or a neutral line of the AC power input to the power factor corrector; and
a second switch configured to selectively connect the AC power input to the power factor corrector or the link capacitor; and
a controller configured to control the power factor corrector and the switch network based on a condition of the AC input power,
wherein the second switch comprises a plurality of switches S3, S4, S5, S6 and S7 that are configured to selectively connect at least one full bridge circuit of the plurality of full bridge circuits to a positive(+) electrode of a battery,
a first leg of the first full bridge circuit is connected to a first AC power input line of the AC power input,
a second leg of the first full bridge circuit is selectively connected, through the first switch S1, to at least one of a second AC power input line of the AC power input of the AC power input or the neutral line of the AC power input,
a first leg of the second full bridge circuit is connected to a third AC power input line of the AC power input through a combination of a third switch S2 and a fourth switch S5, and
a second leg of the second full bridge circuit is connected to the third AC power input line of the AC power input through the third switch S2.

14. The charging apparatus of claim 13, wherein the switch network further comprises:
a fifth switch S3, wherein one end of the fifth switch S3 is connected to the first leg of the first full bridge circuit; and
a sixth switch S4, wherein one end of the sixth switch S4 is connected to the second leg of the first full bridge circuit.

15. The charging apparatus of claim 14, wherein the switch network further comprises:
a seventh switch S6 disposed between another end of the fifth switch S3 and the positive(+) electrode of the battery.

16. The charging apparatus of claim 14, wherein the fourth switch S5 is configured to switch the other end of the fifth switch S3 and a space between the first leg of the second full bridge circuit and the second leg of the second full bridge circuit.

17. The charging apparatus of claim 16, wherein the switch network further comprises:
an eighth switch S7 configured to be switched among an upper end of the second full bridge circuit, the another end of the fifth switch S3, and an upper end of the first full bridge circuit.

18. The charging apparatus of claim 17, wherein the switch network further comprises:
a ninth switch S8 and a tenth switch S9 configured to connect each end of the link capacitor to the positive(+) electrode of the battery and a negative(−) electrode of the battery.

19. The charging apparatus of claim 18, wherein the switch network further comprises:
   an eleventh switch S10 configured to connect the upper end of the first full bridge circuit to one end of the link capacitor.

20. The charging apparatus of claim 13, wherein the condition of the AC input power comprises a multi-phase condition of the AC input power and a single-phase condition of the AC input power.

21. The charging apparatus of claim 13, wherein the condition of the AC input power comprises a symmetric power condition of the AC input power and an asymmetric power condition of the AC input power.

22. A charging apparatus for an electric vehicle comprising:
   an alternating current (AC) power input configured to receive at least one AC input power from single-phase AC power or multi-phase AC power;
   a power factor corrector having a first full bridge circuit and a second full bridge circuit, each of which is configured to receive the AC input power through the AC power input;
   a link capacitor configured to be charged through the power factor corrector;
   a switch network comprising:
      a first switch S1 configured to connect at least one of an AC power input line of the AC power input or a neutral line of the AC power input to the power factor corrector; and
      a second switch configured to selectively connect the AC power input to the power factor corrector or the link capacitor; and
   a controller configured to control the power factor corrector and the switch network based on a condition of the AC input power,
   wherein the second switch comprises a plurality of switches S3, S4, S5, S6 and S7 that are configured to selectively connect at least one full bridge circuit from among the plurality of full bridge circuits to a positive (+) electrode of a battery,
   a first leg of the first full bridge circuit is connected to a first AC power input line of the AC power input,
   a second leg of the first full bridge circuit is selectively connected, through the first switch S1, to at least one of a second AC power input line of the AC power input of the AC power input or the neutral line of the AC power input,
   a first leg of the second full bridge circuit is connected to a third AC power input line of the AC power input through a combination of a third switch S2 and a fourth switch S5, and
   a second leg of the second full bridge circuit is connected to the third AC power input line of the AC power input through the third switch S2,
   wherein the switch network further comprises:
      a fifth switch S3, wherein one end of the fifth switch S3 is connected to the first leg of the first full bridge circuit,
      a sixth switch S4, wherein one end of the sixth switch S4 is connected to the second leg of the first full bridge circuit,
      a seventh switch S6 disposed between another end of the fifth switch S3 and the positive(+) electrode of the battery,
      an eighth switch S7 configured to be switched among an upper end of the second full bridge circuit, the another end of the fifth switch S3, and an upper end of the first full bridge circuit,
      a ninth switch S8 and a tenth switch S9 configured to connect each end of the link capacitor to the positive (+) electrode and of the battery and a negative(−) electrode of the battery, and
      an eleventh switch S10 configured to connect the upper end of the first full bridge circuit to one end of the link capacitor, and
   wherein the fourth switch S5 is configured to switch the another end of the fifth switch S3 and a space between the first leg of the second full bridge circuit and the second leg of the second full bridge circuit.

23. The charging apparatus of claim 22, wherein the condition of the AC input power comprises a multi-phase condition of the AC input power and a single-phase condition of the AC input power.

24. The charging apparatus of claim 22, wherein the condition of the AC input power comprises a symmetric power condition of the AC input power and an asymmetric power condition of the AC input power.

* * * * *